(12) United States Patent
Morioka

(10) Patent No.: US 7,022,260 B2
(45) Date of Patent: Apr. 4, 2006

(54) FLUORESCENT MEMBER, AND ILLUMINATION DEVICE AND DISPLAY DEVICE INCLUDING THE SAME

(75) Inventor: Tatsuya Morioka, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 18 days.

(21) Appl. No.: 10/652,441

(22) Filed: Aug. 28, 2003

(65) Prior Publication Data

US 2005/0012076 A1    Jan. 20, 2005

(30) Foreign Application Priority Data

Sep. 20, 2002  (JP) .............................. 2002-275135

(51) Int. Cl.
*F21K 2/00*    (2006.01)

(52) U.S. Cl. .................. 252/301.4 R; 252/301.6 S; 252/301.4 F; 372/43; 372/49; 372/66; 257/103; 257/100; 313/486; 313/487; 313/503

(58) Field of Classification Search ............... 313/486, 313/487, 503; 257/103, 100, E33.06; 372/43, 372/49, 66; 252/301.4 R, 301.6 S, 301.4 F
See application file for complete search history.

(56) References Cited

U.S. PATENT DOCUMENTS

| | | | | |
|---|---|---|---|---|
| 3,560,783 A | * | 2/1971 | Shortes .................. | 313/467 |
| 3,891,886 A | * | 6/1975 | Woontner ................ | 313/467 |
| 3,927,240 A | * | 12/1975 | Hammond et al. ......... | 428/403 |
| 4,377,769 A | * | 3/1983 | Beatty et al. ............. | 313/495 |
| 5,244,750 A | * | 9/1993 | Reilly et al. ............. | 428/690 |
| 5,418,062 A | * | 5/1995 | Budd ..................... | 428/403 |
| 6,077,458 A | * | 6/2000 | Shiiki et al. .......... | 252/301.4 R |
| 6,447,908 B1 | * | 9/2002 | Yun et al. ............... | 428/403 |
| 6,734,466 B1 | * | 5/2004 | Chua ....................... | 257/82 |
| 6,794,265 B1 | * | 9/2004 | Lee et al. ................. | 438/409 |
| 6,890,777 B1 | * | 5/2005 | Bawendi et al. ........... | 438/22 |

FOREIGN PATENT DOCUMENTS

| JP | 58-212034 | * 12/1983 |
|---|---|---|
| JP | 11-340516 | 12/1999 |
| JP | 2001-184916 | 7/2001 |

OTHER PUBLICATIONS

Anonymous (1975). *Optical Technology Handbook*, Partial English Translation from pp. 1112-1113.

* cited by examiner

*Primary Examiner*—C. Melissa Koslow
(74) *Attorney, Agent, or Firm*—Morrison & Foerster LLP

(57) ABSTRACT

A fluorescent member includes a plurality of particles dispersed in a medium. Each particle includes a core and a coating layer covering the core. The core is formed of a semiconductor which absorbs excitation light and emits light of a wavelength different from that of the excitation light. Each particle is made to have a particle size for causing Mie scattering with respect to the excitation light. Thus, a fluorescent member excellent in light conversion efficiency can be obtained.

40 Claims, 15 Drawing Sheets

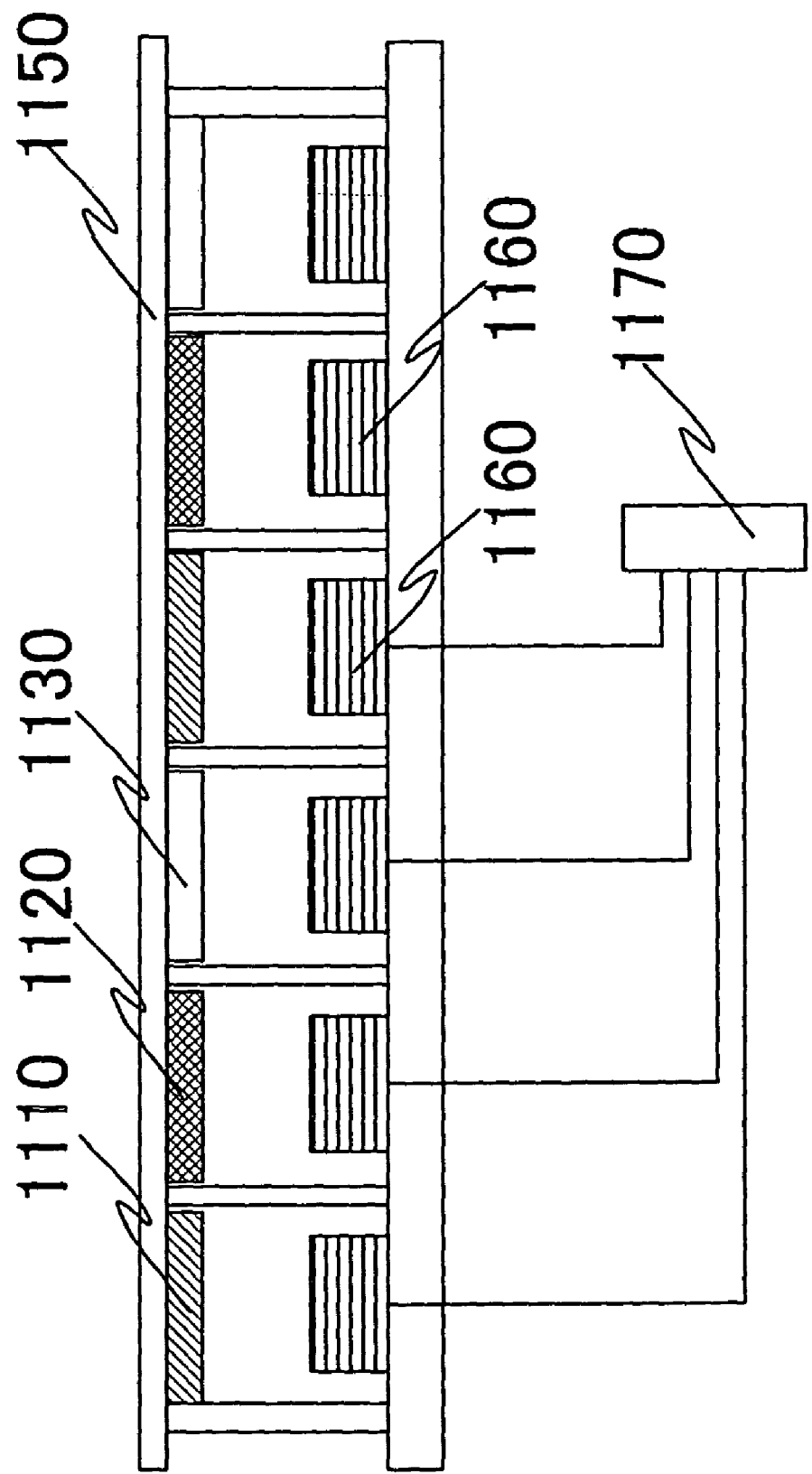

FLUORESCENT MEMBER, AND ILLUMINATION DEVICE AND DISPLAY DEVICE INCLUDING THE SAME

BACKGROUND OF THE INVENTION

1. Field of the Invention

The present invention relates to a fluorescent member including particles which absorb excitation light emitted from a light source and convert a wavelength of the excitation light to emit lights of various colors. Particularly, the present invention relates to a fluorescent member having good light conversion efficiency and a good chromatic characteristic (with respect to shift of color), and a display device and an illumination device including such a fluorescent member.

2. Description of the Background Art

A fluorescent member including microcrystals or nano-crystals (or nano-particles) causing a quantum size effect shows excellent light conversion efficiency in conversion of excitation light into emission light different in wavelength. There is a possibility of obtaining a display device or an illumination device consuming less power by exciting such a fluorescent member with an ultraviolet light-emitting device. Japanese Patent Laying-Open No. 11-340516 discloses examples of such display and illumination devices.

In Japanese Patent Laying-Open No. 11-340516, a ZnCdSe mixed crystal which can absorb excitation light and emit red or green light, and a ZnSe crystal which can emit blue light are disclosed as particle materials to be included in the fluorescent member. The publication further discloses an illumination device and a display device in each of which the fluorescent member is excited by excitation light emitted from a nitride-based semiconductor light-emitting device.

The inventors have found, through detailed investigation of the optical characteristics of the fluorescent member including nano-crystals with respect to excitation light, that the light conversion efficiency, which is a ratio of the amount of light emitted from the fluorescent member to the amount of the excitation light, considerably varies depending on particle structure within the fluorescent member.

SUMMARY OF THE INVENTION

In view of the problem found by the inventors, an object of the present invention is to obtain a fluorescent member including particle structure which can suppress degradation of light conversion efficiency, and to provide an illumination device and a display device including such a fluorescent member.

According to an aspect of the present invention, a fluorescent member includes a plurality of particles dispersed in a medium. Each particle includes a core and a coating layer covering the core. The core is formed of a semiconductor which absorbs excitation light and emits light of a wavelength different from that of the excitation light. The particles each have a particle size (diameter) which causes Mie scattering with respect to the excitation light. Thereby, it is possible to obtain a fluorescent member excellent in light conversion efficiency.

According to another aspect of the present invention, a fluorescent member includes a plurality of particles dispersed in a medium. Each particle includes a core and a coating layer covering the core. The core is formed of a semiconductor which absorbs excitation light and emits light of a wavelength different from that of the excitation light. A diameter $D(\mu m)$ of the particle and a wavelength $\lambda(\mu m)$ of the excitation light satisfy $D/\lambda \geq 0.2$. Thereby, it is possible to obtain a fluorescent member excellent in light conversion efficiency.

The coating layer may also be formed of a semiconductor. The fluorescent member can emit lights of various colors by including cores different in composition from each other. Alternatively, the fluorescent member can emit lights of various colors by including cores of the same composition and of different sizes. The material for the core may be selected from $In_xGa_yAl_{1-x-y}N$ ($0 \leq x \leq 1$, $0 \leq y \leq 1$, $x+y \leq 1$), $Zn_xMg_yCd_{1-x-y}Se_vS_{1-v}$ ($0 \leq x \leq 1$, $0 \leq y \leq 1$, $x+y \leq 1$, $0 \leq v \leq 1$), Si and C.

Each particle may be composed of a plurality of cores for emitting light of the same wavelength and a coating layer covering the cores. Alternatively, each particle may be composed of a plurality of cores for emitting lights of different wavelengths and a coating layer covering the cores.

By using the above-described fluorescent member and a light source for exciting the same, it is possible to provide an illumination device consuming less power. It is also possible to provide a display device consuming less power, by using the above-described fluorescent member, a light source for exciting the same, and a light controlling unit for controlling at least one of intensity of light emitted from the fluorescent member and intensity of the excitation light directed to the fluorescent member.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 15 is a schematic cross sectional view showing another display device according to the present invention.

DESCRIPTION OF THE PREFERRED EMBODIMENTS

The inventors have found, through detailed investigation of optical characteristics of a fluorescent member, that occurrence of Rayleigh scattering in a fluorescent member including a nano-crystal particle causes a problem associated with light conversion efficiency.

(First Embodiment)

Figure 1:
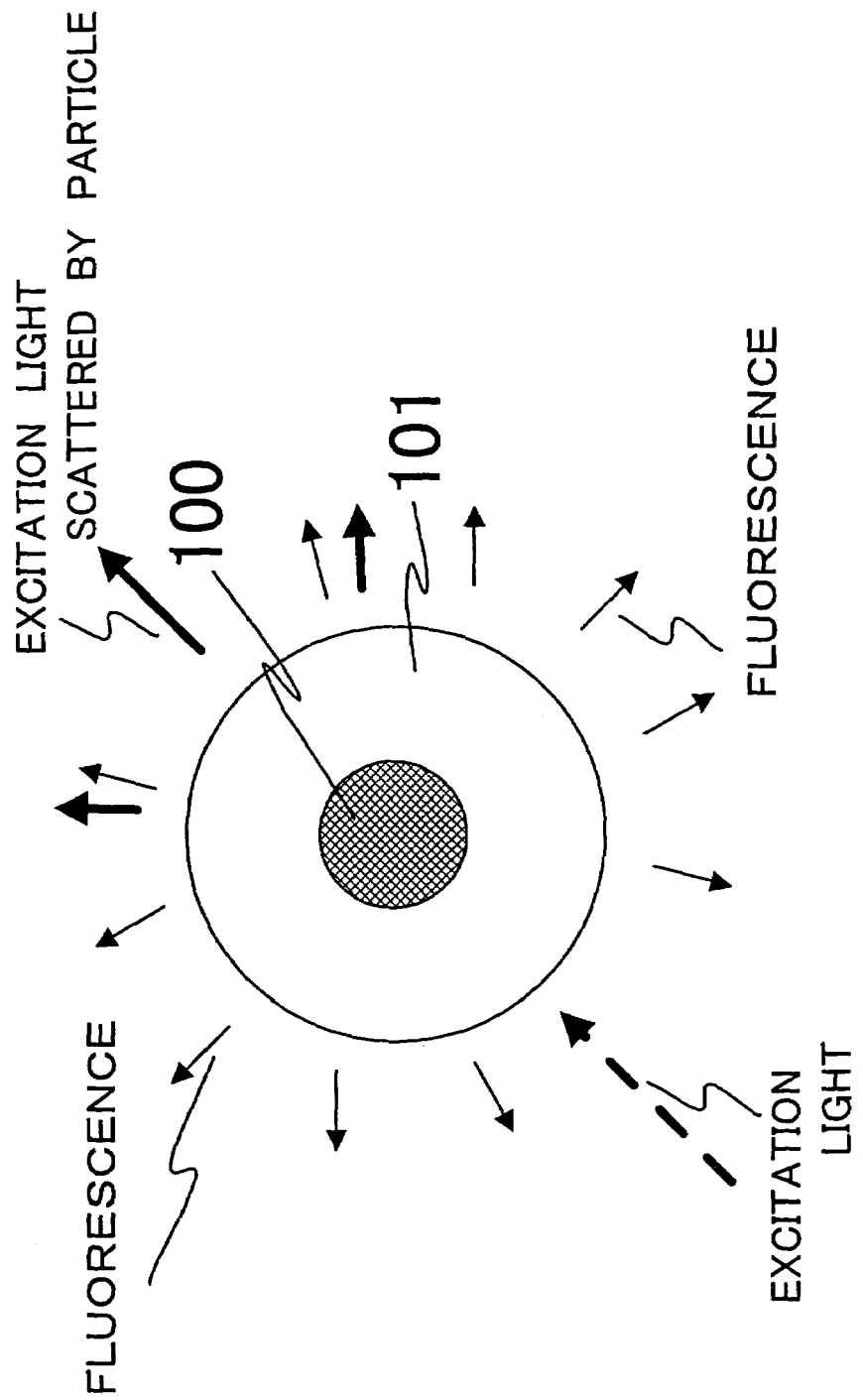
FIG. 1 is a schematic cross sectional view showing excitation light Mie-scattered by a particle of the present invention, and fluorescence emitted from the particle.
Figure 2:
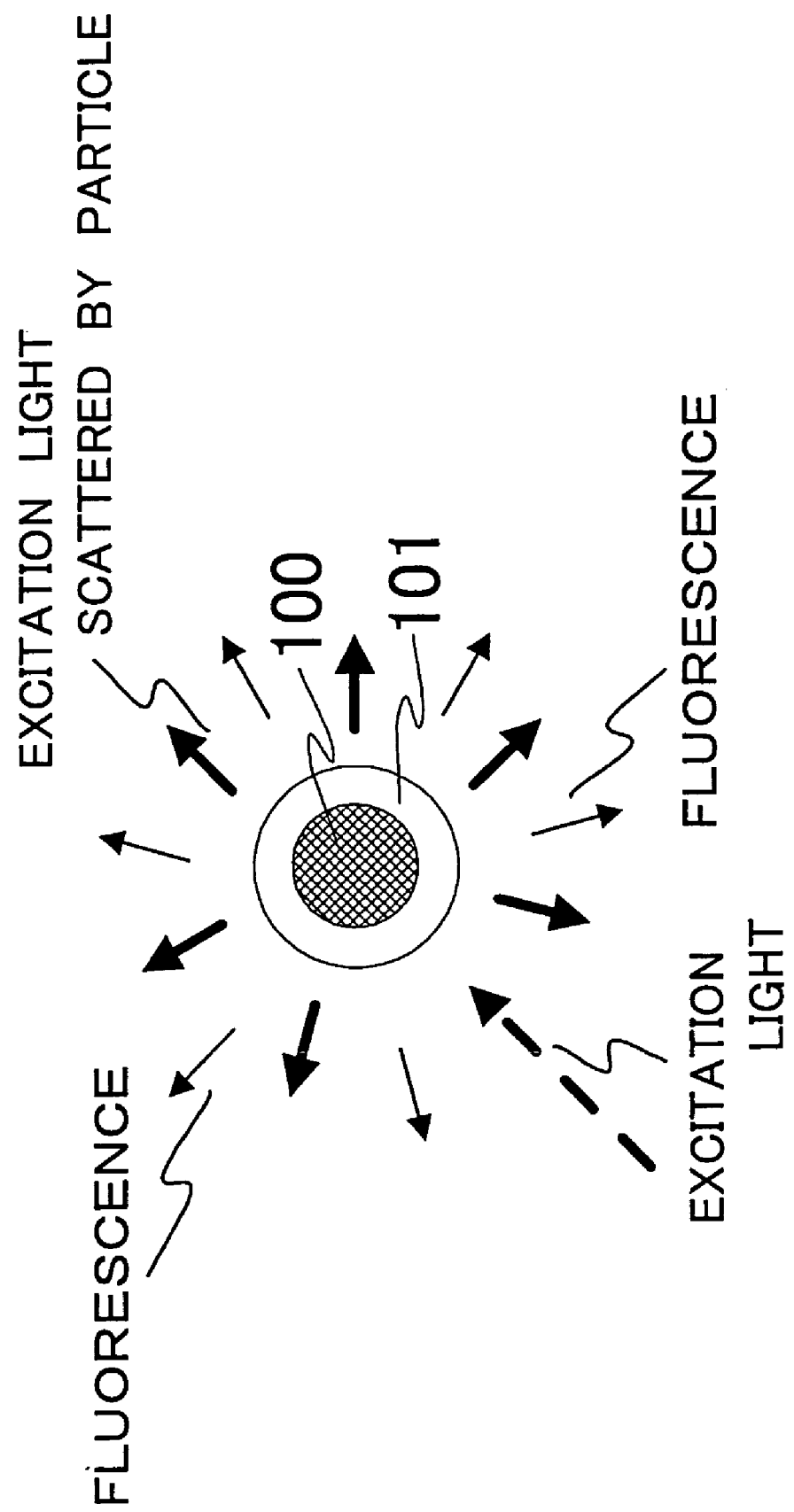
FIG. 2 is a schematic cross sectional view showing excitation light Rayleigh-scattered by a particle, and fluorescence emitted from the particle.
Figure 3:
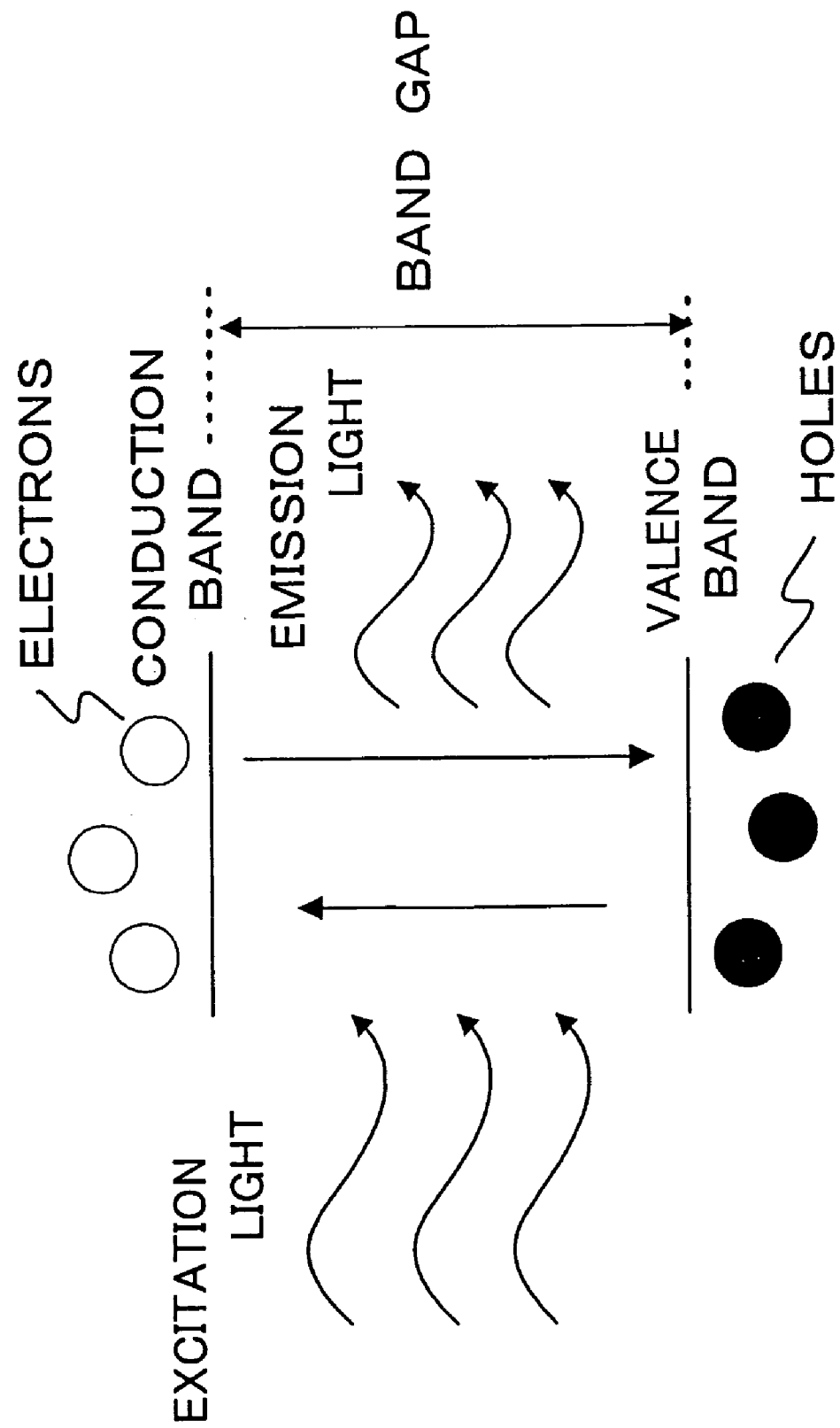
FIG. 3 is an energy band structure diagram illustrating principles of absorption of excitation light and emission of fluorescence by a particle of the present invention.
Figure 4:
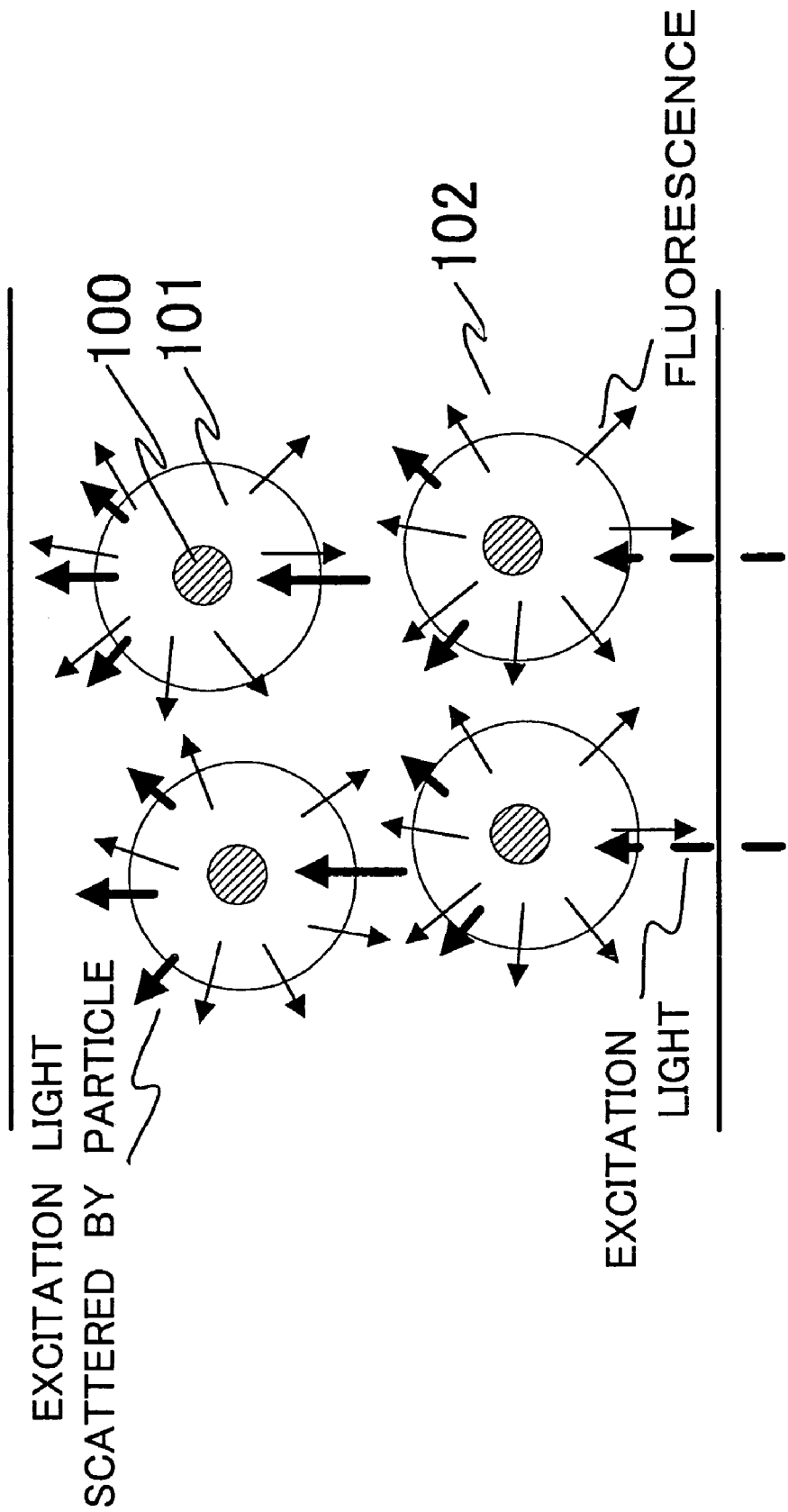
FIG. 4 is a schematic cross sectional view showing Mie-scattered excitation light and emitted fluorescence in a fluorescent member of the present invention.
Figure 5:
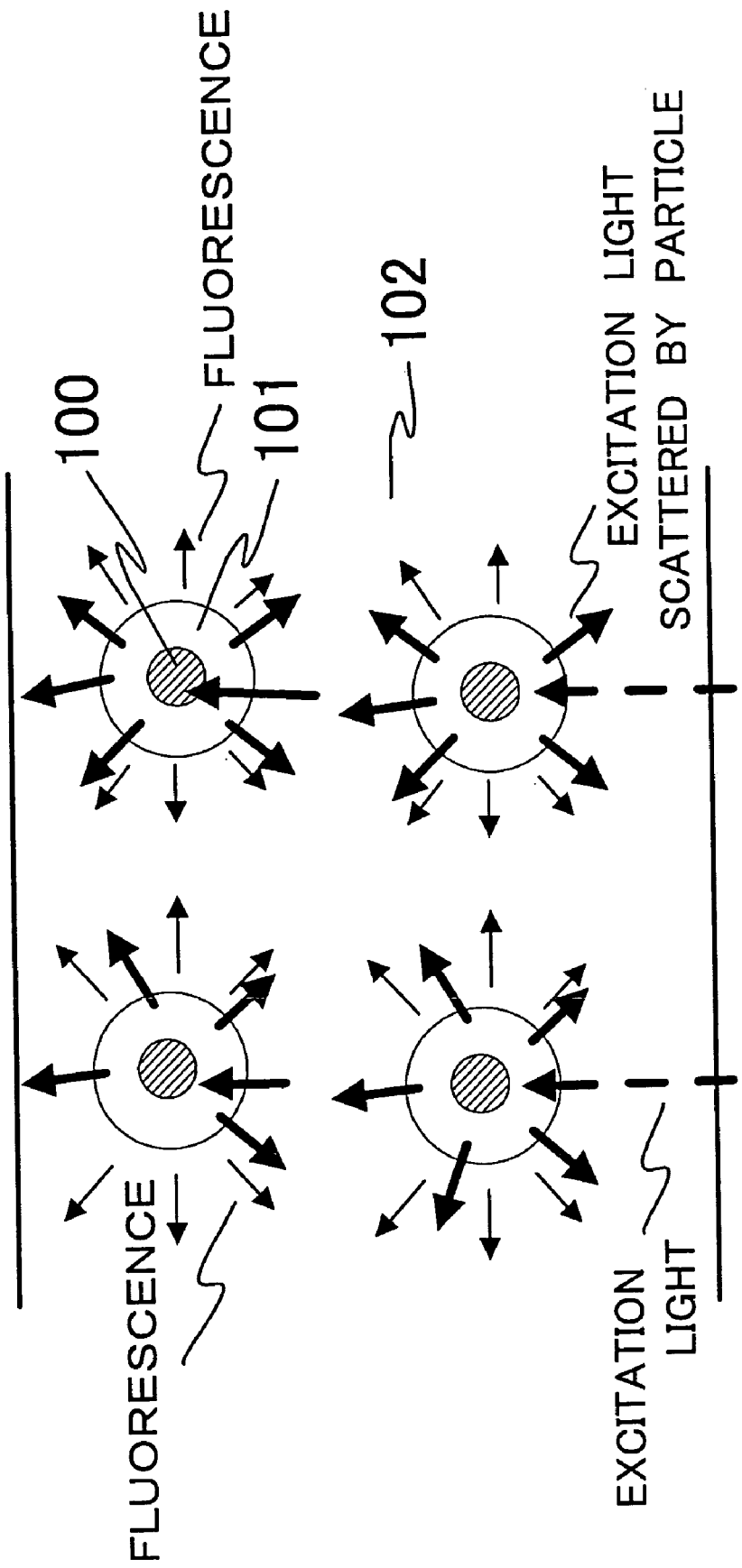
FIG. 5 is a schematic cross sectional view showing Rayleigh-scattered excitation light and emitted fluorescence in a fluorescent member.

A first embodiment of the present invention is explained with reference to FIGS. 1 and 2 showing difference in scattered states of excitation light in the case of irradiating particles of different structures with the excitation light, FIG. 3 illustrating an energy band structure and a light emission mechanism in a particle, and FIGS. 4 and 5 showing difference in scattered states of excitation light in fluorescent members including particles of different structures. In the drawings, the same reference numbers denote the same or corresponding portions.

Firstly, a particle of the present invention includes a semiconductor core and a coating layer covering the core. The semiconductor core has a bandgap structure as shown in FIG. 3. The core, when irradiated with excitation light, absorbs the excitation light, and electrons and holes emerge in the core. Recombination of the electrons and holes within the core results in emission of light having a color corresponding to the bandgap of the core.

In FIGS. 1 and 2, a particle of a 500 nm diameter including an epoxy resin layer 101 covering an InN core 100 of a 5 nm diameter, and a particle of a 60 nm diameter including epoxy resin layer 101 covering InN core 100 of the 5 nm diameter, both utilizing the above-described wavelength conversion principle, are irradiated with excitation light of a wavelength of 400 nm. In each of such cases, a state of the excitation light unabsorbed and scattered by core 100 is shown in the corresponding one of FIGS. 1 and 2. In each of FIGS. 1 and 2, a broken-line arrow represents initial excitation light, a bold-line arrow represents the excitation light scattered by the particle, and a thin-line arrow represents fluorescence emitted from cores 100. Part of the excitation light absorbed by core 100 is converted into blue light having a wavelength of about 480 nm and then emitted from core 100.

When the particle size is small with respect to the wavelength of the excitation light, as shown in FIG. 2, the excitation light is scattered in all directions due to Rayleigh scattering by the particle. In contrast, when the particle size is large with respect to the wavelength of the excitation light, as shown in FIG. 1, the excitation light is scattered strongly in a propagation direction of the excitation light (hereinafter, also referred to as "forward scattering") due to Mie scattering by the particle. FIGS. 4 and 5 show scattering of the excitation light in fluorescent members in which particles having the scattering characteristics shown in FIGS. 1 and 2 are dispersed in acrylic resins 102, respectively.

When the particle size is small with respect to the wavelength of the excitation light, as shown in FIG. 5, the excitation light is scattered in all directions due to the Rayleigh scattering by each particle. Of the excitation light scattered in all directions, the excitation light reflected in a direction (backward scattering direction) opposite to the propagation direction (forward scattering direction) is directed to a particle present in the backward scattering direction. However, the particle in the back has already been irradiated with the excitation light, and electrons and holes have already emerged therein. Due to saturation of such already existing electrons and holes, the particle in the back hardly absorbs the excitation light scattered backward and mostly transmits the same. As a result, the light scattered backward becomes loss of the excitation light, causing degradation of light conversion efficiency.

Moreover, according to the characteristic of the Rayleigh scattering, scattered intensity in any direction is proportional to a reciprocal of the biquadrate of the wavelength of the irradiating light. Therefore, the excitation light of a shorter wavelength to be converted into visible light is more liable to be scattered and it less reaches the fluorescent core. Still further, in the Rayleigh scattering, scattered intensities with respect to lights of different wavelengths (e.g., blue, green, red) emitted from the particles irradiated with the excitation light are different from each other. Thus, the lights of different wavelengths having reached the surface of the fluorescent member have different luminous intensities, causing shift of chromaticity (shift of color).

By comparison, when the particle size is large with respect to the wavelength of the excitation light, the excitation light is subjected to Mie scattering by each particle, so that it is scattered strongly in the propagation direction of the excitation light (forward scattering). The excitation light scattered forward is directed to and absorbed by the particle present at the surface of the fluorescent member (in the light propagation direction), and light of a different wavelength is emitted from the particle. Thus, by setting the particle size so as to cause Mie scattering, it is possible to uniformly excite the particles in the fluorescent member. According to the characteristic of the Mie scattering, there is no dependence of scattered intensity on the wavelength, differently from the case of the Rayleigh scattering. Thus, the shift of chromaticity (shift of color) can also be suppressed.

Namely, in the present invention, a diameter of a particle included in a fluorescent member is set so as to suppress Rayleigh scattering and cause Mie scattering with respect to excitation light. More specifically, the relation of $D/\lambda \geq 0.2$ (D: particle size ($\mu m$), and $\lambda$: wavelength of excitation light ($\mu m$)) is satisfied, which is shown in "Optical Technology Handbook", p. 1112, published by Asakura Co. It is possible to obtain a fluorescent member excellent both in light conversion efficiency and in chromaticity by setting a particle size in the above-described manner. The fluorescent member of the present invention may include a core of YAG $((Y_a, Gd_{1-a})_3(Al_b, Ga_{1-b})O_{12}:Ce^{3+})$, $(0 \leq a \leq 1, 0 \leq b \leq 1)$, for example.

(Second Embodiment)

Figure 6:
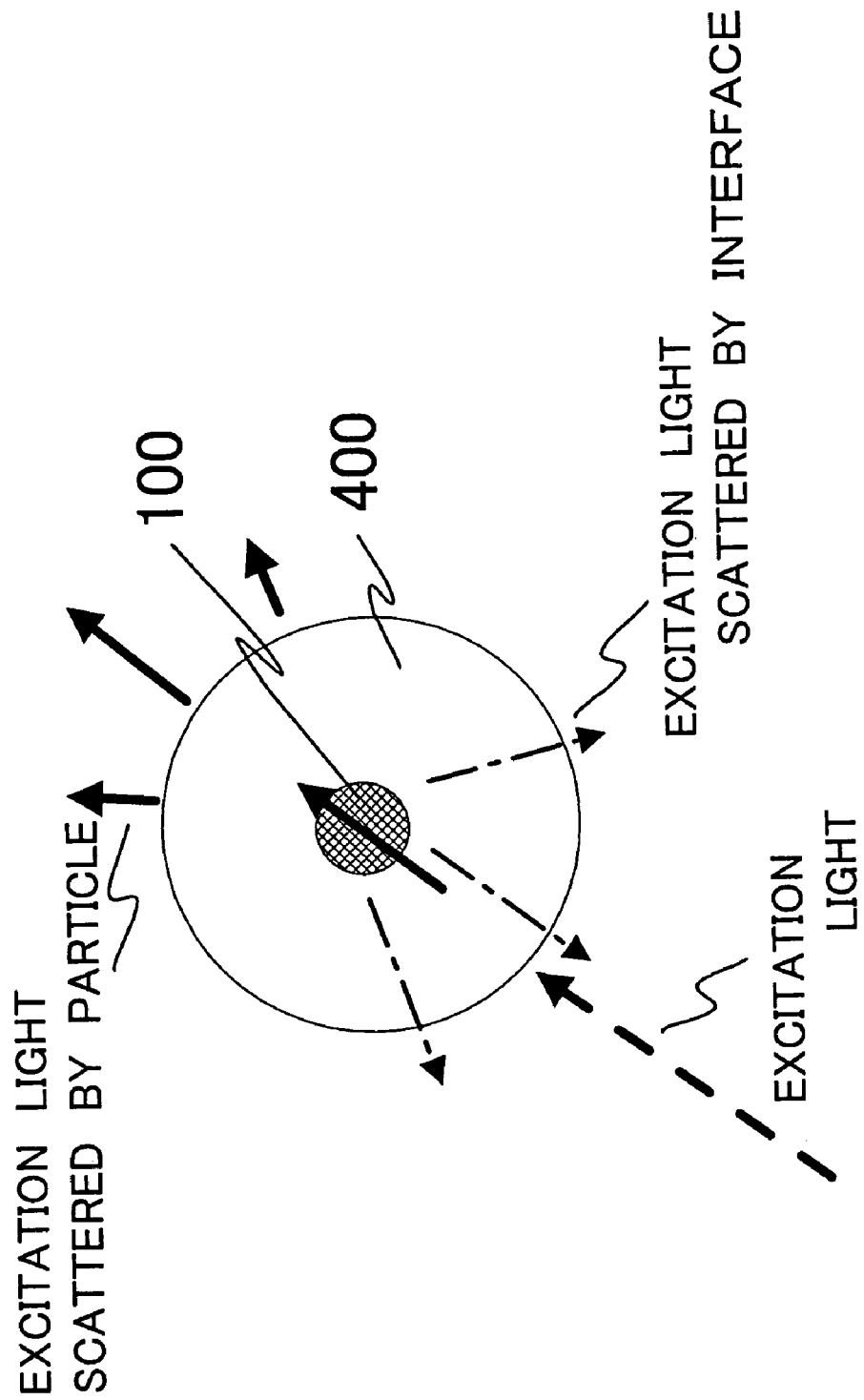
FIG. 6 is a schematic cross sectional view showing scattering of light inside a particle according to the present invention.

FIG. 6 schematically illustrates interaction between light and a particle in a second embodiment of the present invention. In the present embodiment, a GaN coating layer 400 is formed to cover an InN core 100 of a 13 nm diameter so as to obtain a particle size of 500 nm. When this particle is irradiated with excitation light of a wavelength of 400 nm, red light of a wavelength of 650 nm is emitted from the particle.

The particle size $D(\mu m)$ and the wavelength $\lambda(\mu m)$ of the excitation light are set so as to satisfy the relation suppressing the Rayleigh scattering and causing the Mie scattering, i.e., $D/\lambda \geqq 0.2$. In doing so, it is possible to reduce loss of the excitation light due to the Rayleigh scattering in all directions caused by the particle and obtain favorable light conversion efficiency, similarly as in the first embodiment.

Further, since GaN coating layer 400 is formed to cover InN core 100 (i.e., since both of them are semiconductors), they are similar in refractive index with each other. Thus, the difference in refractive index at the interface between the core and the coating layer becomes small compared with in the case of the first embodiment (the refractive indices of InN and GaN are 2–2.5, while the refractive index of epoxy resin is 1.5).

Reflection of the excitation light at the interface between the core and the coating layer is proportional to the square of the difference of their refractive indices. Thus, the reflection of the excitation light at the interface can be restricted when the refractive index difference is small. As a result, the excitation light is efficiently absorbed by the InN core, and thus favorable light conversion efficiency is ensured. In FIG. 6, a chain line arrow schematically shows the reflection of the excitation light at the interface between the core and the coating layer.

When a GaN semiconductor is used for coating layer 400, the dangling bonds at the surface of InN core 100 can be terminated. Thus, it is possible to reduce the density of the non-radiative recombination centers attributable to the dangling bonds. This further improves the light conversion efficiency.

Not restricted to GaN, any semiconductor can be used for a material of the semiconductor coating layer covering the InN core, as long as it has a bandgap greater than that of the InN core.

(Third Embodiment)

A third embodiment of the present invention differs from the first embodiment in that the composition ratio of the semiconductor core included in the particle is varied. In the first embodiment, the diameter of the InN core has been changed in order to change the bandgap of the semiconductor core. In the present embodiment, the bandgap of the semiconductor core is changed by changing the In composition ratio in the $In_xGa_{1-x}N$-based semiconductor.

Figure 7:
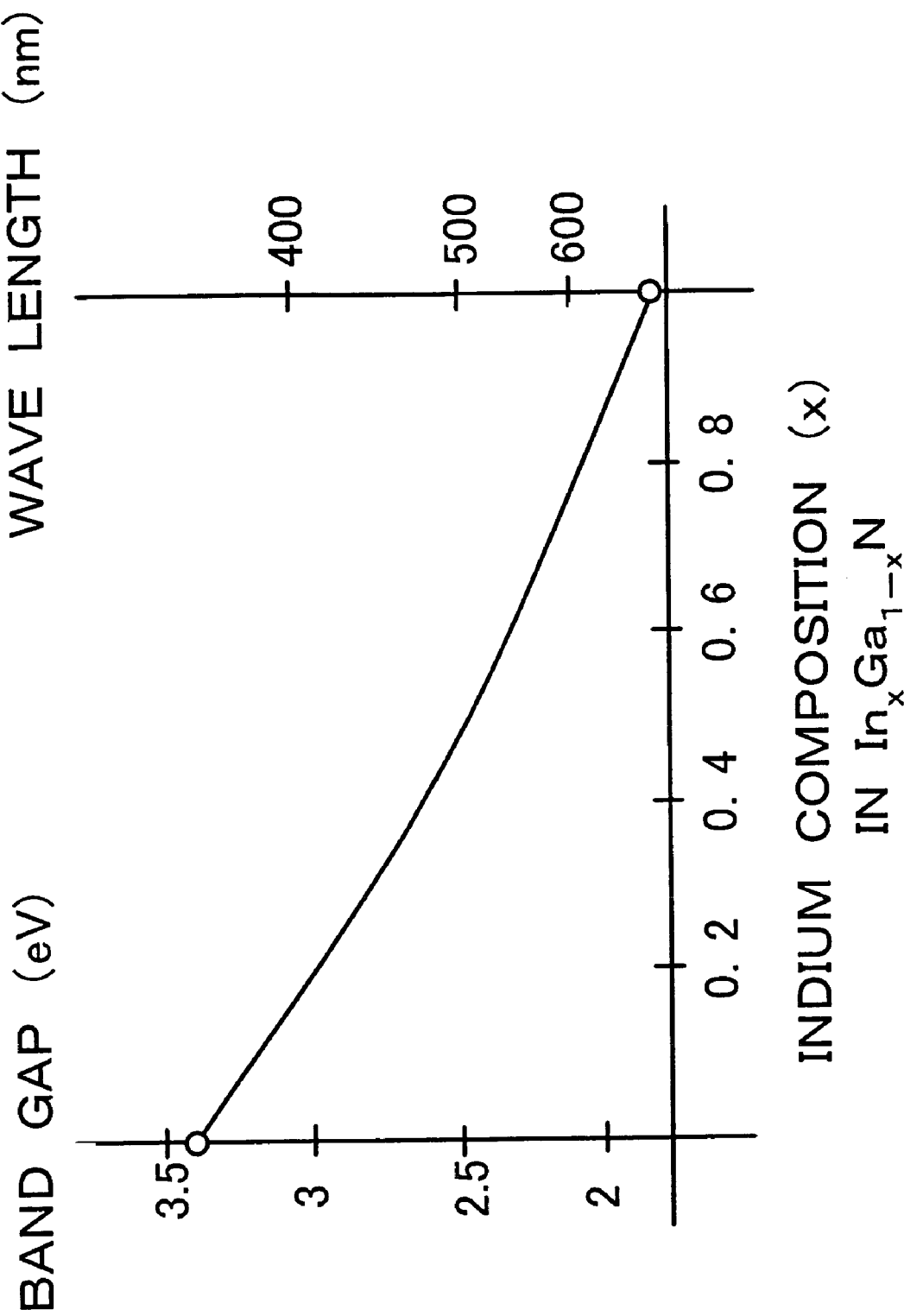
FIG. 7 is a graph showing dependence of the bandgap of the $In_xGa_{1-x}N$-based semiconductor on the In composition ratio x.

FIG. 7 shows dependence of the bandgap on the In composition ratio of the $In_xGa_{1-x}N$-based semiconductor. In the graph, the horizontal axis represents the In composition ratio (x) of the $In_xGa_{1-x}N$ mixed crystal; the left vertical axis represents the bandgap (eV); and the right vertical axis represents the wavelength (nm) corresponding to the bandgap. Specifically, the bandgap becomes narrower as the In composition ratio x increases, and the wavelength of light emitted from the particle becomes longer. Use of such a characteristic makes it possible to obtain a particle which emits light of any desired color, by changing the In composition ratio corresponding to the desired wavelength.

Figure 8:
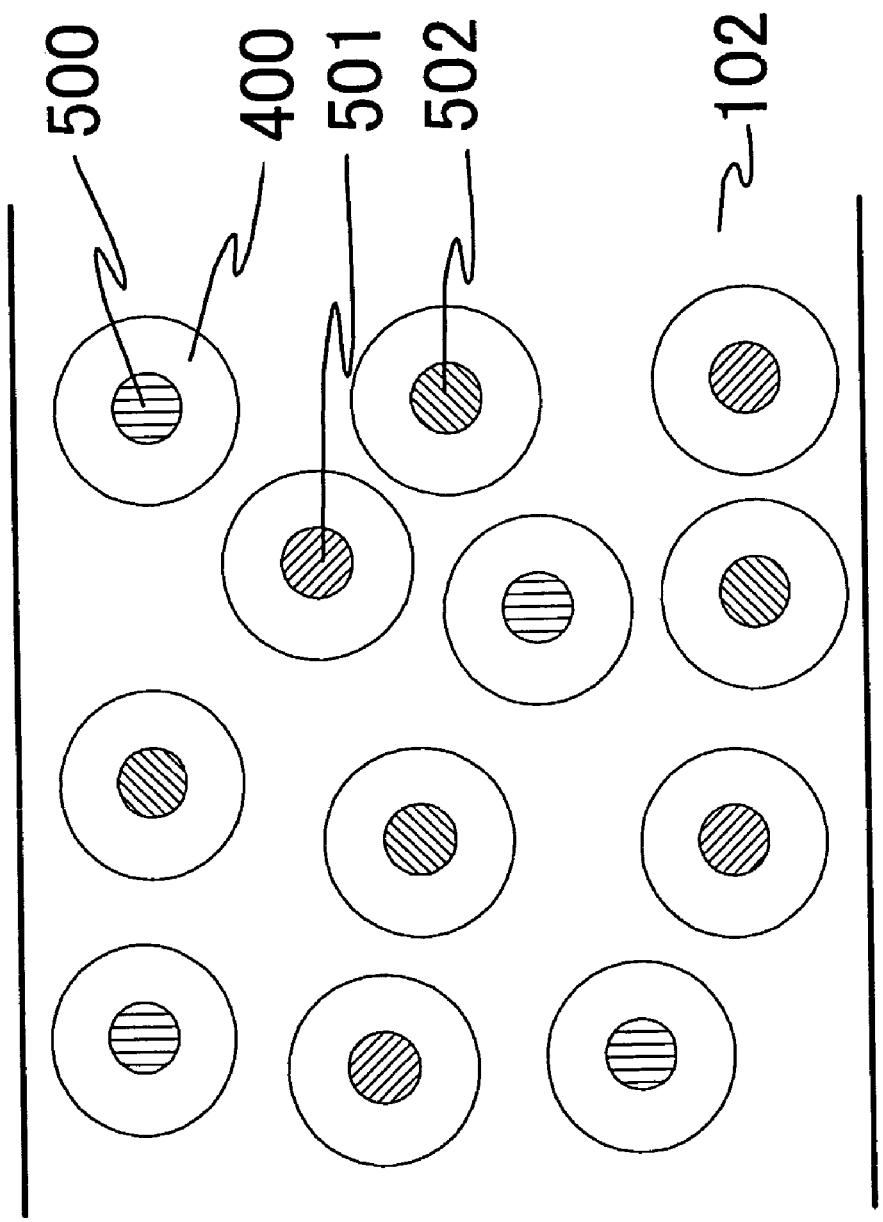
FIG. 8 is a schematic cross sectional view showing a structure of a fluorescent member according to the present invention.

As shown in FIG. 8, for example, lights of blue, green and red colors can be emitted from $In_xGa_{1-x}N$ cores 500, 501 and 502 of the same 100 nm diameter having In composition ratios x of 0.46, 0.59 and 0.95, respectively. GaN coating layers 400 are applied to the $In_xGa_{1-x}N$-based cores so as to form particles of the same 500 nm diameter.

As shown in FIG. 8, these particles are dispersed in acrylic resin 102 in equal ratios to obtain a fluorescent member emitting white light. With the configuration described above, it is possible to reduce loss of the excitation light due to the Rayleigh scattering in all directions caused by the particles and obtain favorable light conversion efficiency, similarly as in the first embodiment.

In order to obtain the similar effect, an $In_xGa_yAl_{1-x-y}N$-based semiconductor or a $Zn_xMg_yCd_{1-x-y}Se_vS_{1-v}$-based semiconductor besides the $In_xGa_{1-x}N$-based semiconductor may be used for the semiconductor core to be included in the particle.

In the case of particles having their InN core sizes changed so as to adjust wavelengths of emission lights, the particles have different core sizes and hence different core volumes. Therefore, the amount of excitation light received by the core varies depending on the core size and then the amount of light emitted from the particle also varies depending on the core size.

In contrast, since the particles for emitting lights of different wavelengths can have the same core volume in the case of the present embodiment, it is possible to avoid the problem that the particles emit the different amounts of lights. Accordingly, it is readily possible to set chromaticity by simply changing the mixing ratio of the particles for emitting lights of different wavelengths.

(Fourth Embodiment)

Figure 9:
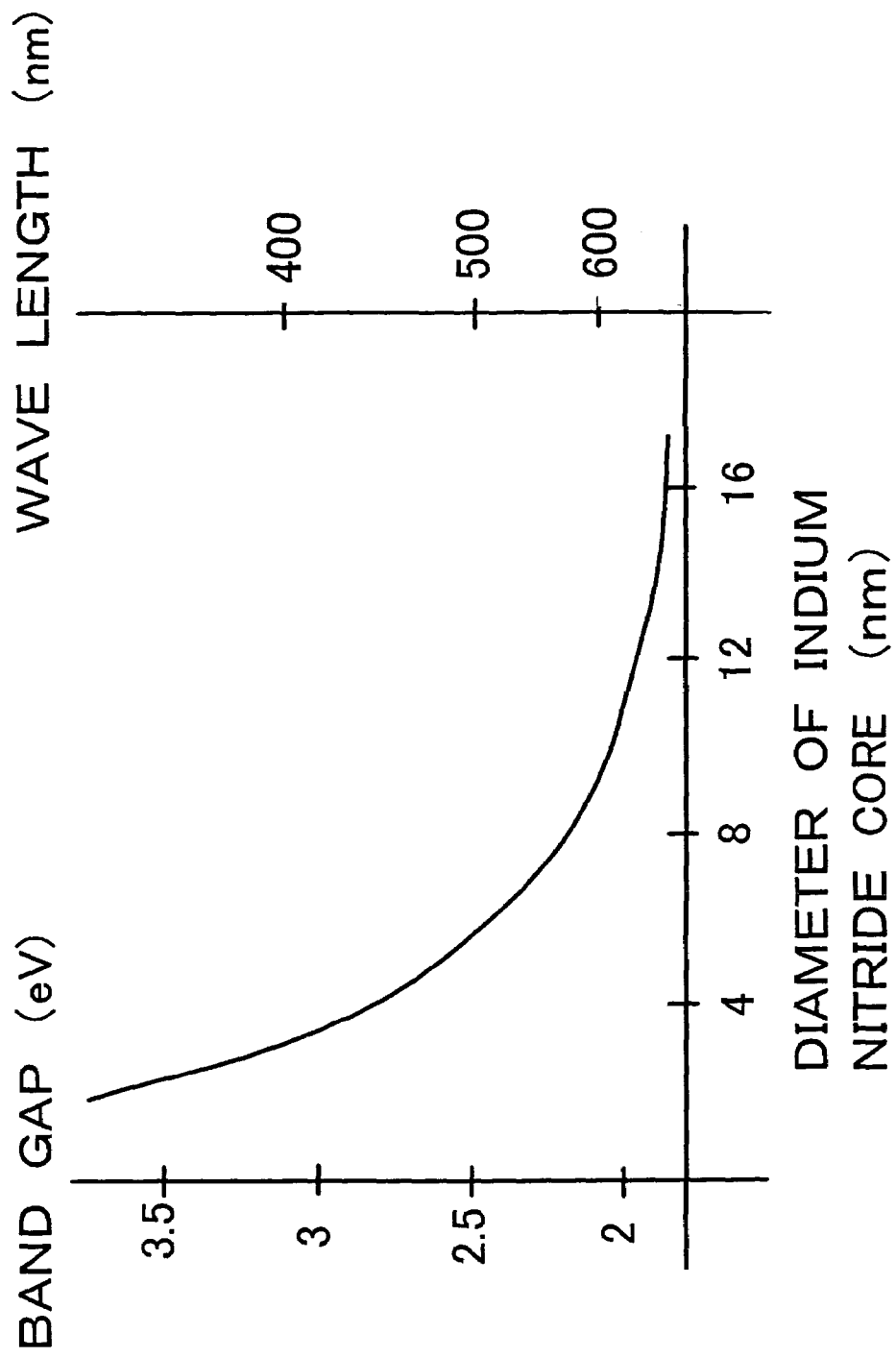
FIG. 9 is a graph showing dependence of the bandgap of the InN core on its diameter.

In a fourth embodiment of the present invention, the bandgap of the semiconductor is varied by changing the diameter of the InN core, similarly as in the first embodiment. FIG. 9 shows dependence of the bandgap on the size of the InN core. Specifically, in this graph, the horizontal axis represents the diameter (nm) of the InN core; the left vertical axis represents the bandgap (eV); and the right vertical axis represents the wavelength corresponding to the bandgap. As seen from FIG. 9, as the size of the core decreases, the bandgap increases due to the quantum effect, and the wavelength of light emitted from the core becomes shorter.

As such, even if the same semiconductor are used for cores, it is possible to obtain particles for emitting lights of different wavelengths, by simply changing the core size. Accordingly, it is unnecessary to control the composition ratio of the core in the fourth embodiment differently from the third embodiment, and the light conversion efficiency can be improved by the quantum effect.

The diameters of the InN cores are set to 5 nm, 6 nm and 13 nm so as to emit lights of blue, green and red colors, respectively. GaN coating layers 400 are formed to cover the respective cores and to cause the same particle sizes of 500 nm. The particles thus obtained are dispersed in an acrylic resin in equal ratios, for example.

According to the configuration of the fourth embodiment described above, it is possible to reduce Rayleigh scattering with which some of the excitation light is lost as scattered in all directions by the particles, similarly as in the first embodiment. The light conversion efficiency is thus improved.

Further, the GaN coating layers covering the InN cores are formed to have thicknesses of 247.5 nm, 247 nm and 243.5 nm to cover the cores of diameters of 5 nm, 6 nm and 13 nm, respectively, such that every particle has the same diameter of 500 nm. As such, the state in which the excitation light is Mie-scattered by each particle can be made substantially the same between the particles. As a result, it is possible to obtain uniform intensity distribution of the excitation lights scattered by the particles in the fluorescent member, irrespective of the dispersed state of the particles therein.

In order to obtain the similar effect, an $In_xGa_yAl_{1-x-y}N$-based semiconductor, a $Zn_xMg_yCd_{1-x-y}Se_vS_{1-v}$-based semiconductor, a Si-based semiconductor, or a C-based semiconductor besides the $In_xGa_{1-x}N$-based semiconductor may be used as the semiconductor constituting the particle.

Fifth Embodiment

Figure 10:
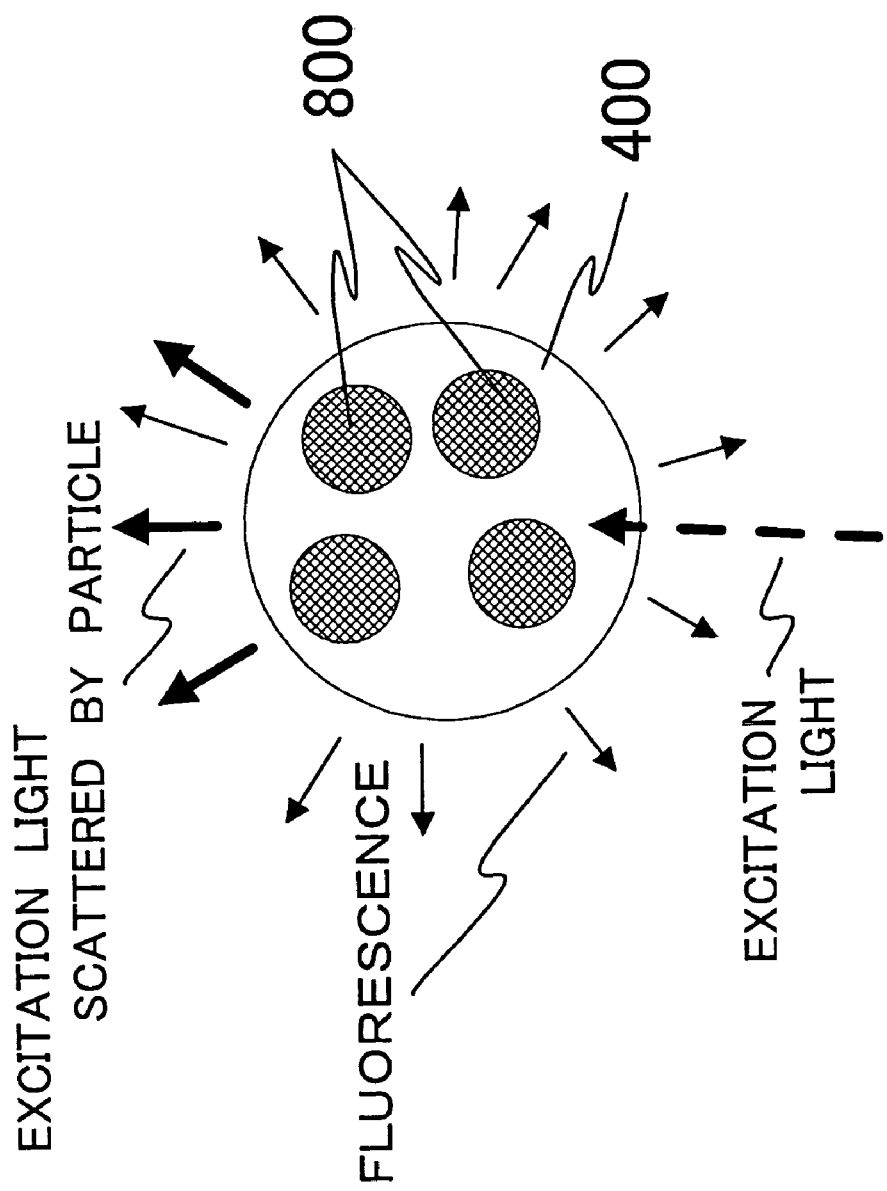
FIG. 10 is a schematic cross sectional view showing another structure of a particle according to the present invention.

In a fifth embodiment of the present invention, as shown in FIG. 10, GaN coating layer 400 is formed to cover a plurality of InN cores 800 each having a diameter of 13 nm and for emitting red light, in order to cause a particle size of 500 nm. Such particles thus obtained are dispersed in an acrylic resin (not shown) in a fluorescent member.

The particle size D(μm) and the wavelength λ(μm) of excitation light are set so as to satisfy the relation for suppressing Rayleigh scattering and causing Mie scattering, i.e., $D/\lambda \geq 0.2$. As such, it is possible to reduce loss of the excitation light due to the Rayleigh scattering in all directions caused by the particles and obtain favorable light conversion efficiency.

In the case that each particle has only one InN core as in the first embodiment, the volume ratio of the InN core for absorbing the excitation light and converting its wavelength occupies only about 0.7% of the total volume of the particle. In this case, most of the excitation light directed to the particle becomes loss without being absorbed by the InN core. Even in the case that the particle size is made small to increase the volume ratio of the core, it is still necessary to keep the particle size greater than 80 nm in the range of causing Mie scattering (for the excitation wavelength of 400 nm), which results in the core volume ratio merely on the order of 2.6%. As such, it is difficult to improve the light conversion efficiency.

Under such circumstances, when each particle is formed to include a plurality of InN cores for emitting light of the same wavelength as in the present embodiment, it is possible to improve the light conversion efficiency per particle even if the particle size is made large.

(Sixth Embodiment)

Figure 11:
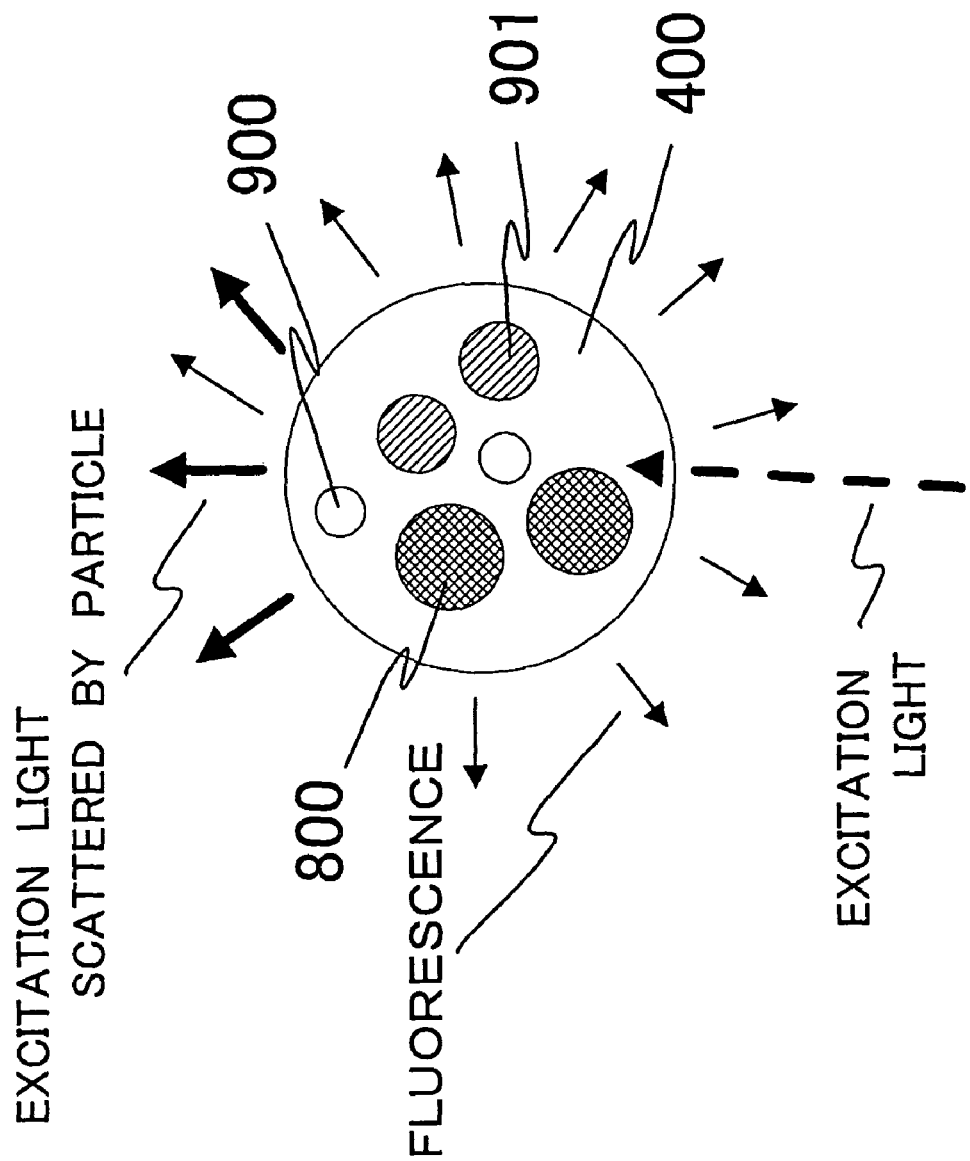
FIG. 11 is a schematic cross sectional view showing yet another structure of a particle according to the present invention.

In a sixth embodiment of the present invention, as shown in FIG. 11, InN cores 900, 901 and 800 have diameters of 5 nm, 6 nm and 13 nm to emit lights of blue, green and red, respectively, and GaN coating layer 400 is formed to cover the InN cores and cause a particle size of 500 nm. The particles thus obtained are dispersed in an acrylic resin (not shown) in a fluorescent member.

The content ratios of the InN cores for emitting lights of the respective colors in the GaN coating layer can be adjusted as appropriate in accordance with desired chromaticity. Further, the particle size D(μm) and the wavelength λ(μm) of excitation light are set so as to satisfy the relation for suppressing Rayleigh scattering and causing Mie scattering, i.e., $D/\lambda \geq 0.2$. As such, it is possible to reduce loss of the excitation light due to the Rayleigh scattering in all directions caused by the particles and obtain favorable light conversion efficiency.

In addition, also in the present embodiment where each particle is formed to include a plurality of InN cores for emitting lights of different wavelengths, it is possible similarly as in the fifth embodiment to increase the core volume ratio per particle and improve the light conversion efficiency even when the particle size is increased.

(Seventh Embodiment)

Figure 12:
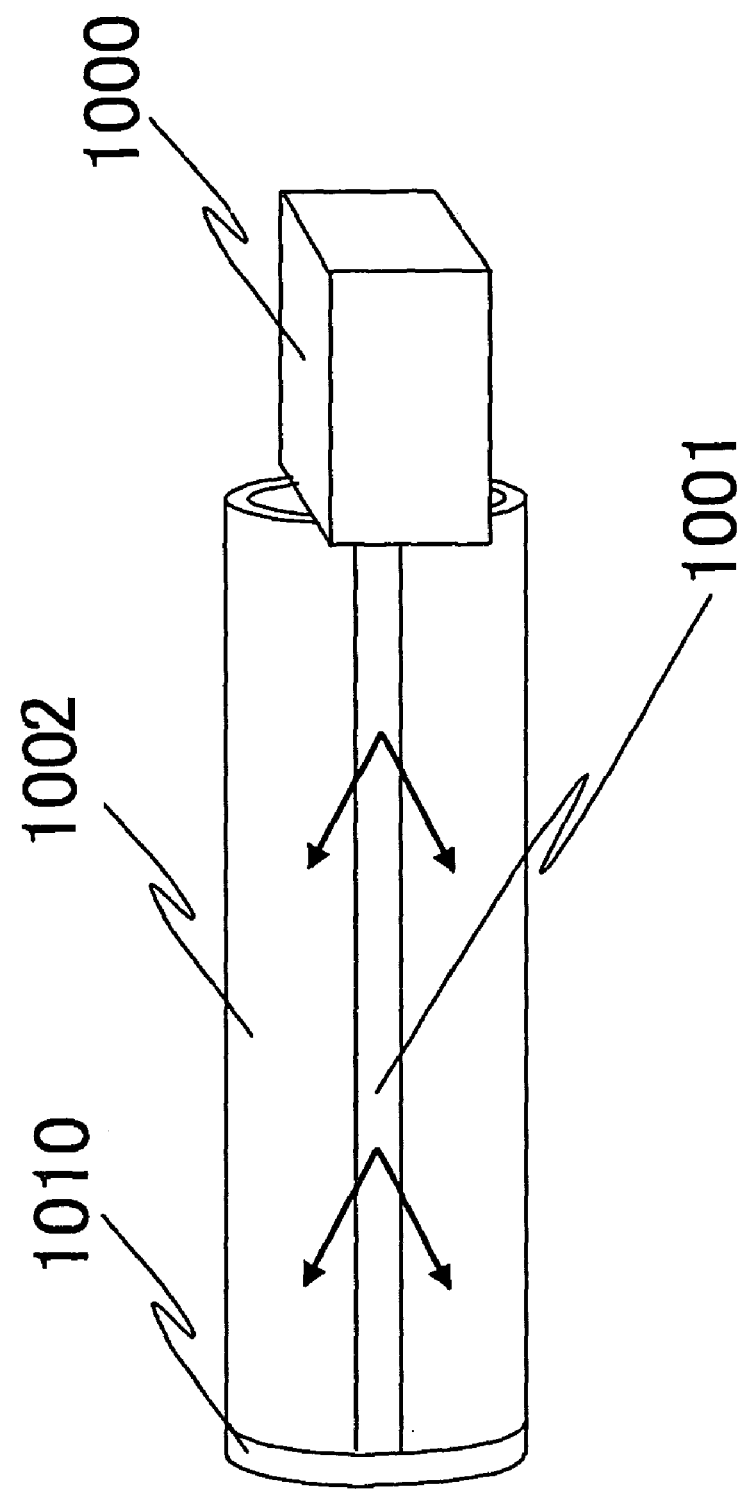
FIG. 12 is a schematic perspective view showing a light guide member in an illumination device according to the present invention.
Figure 13:
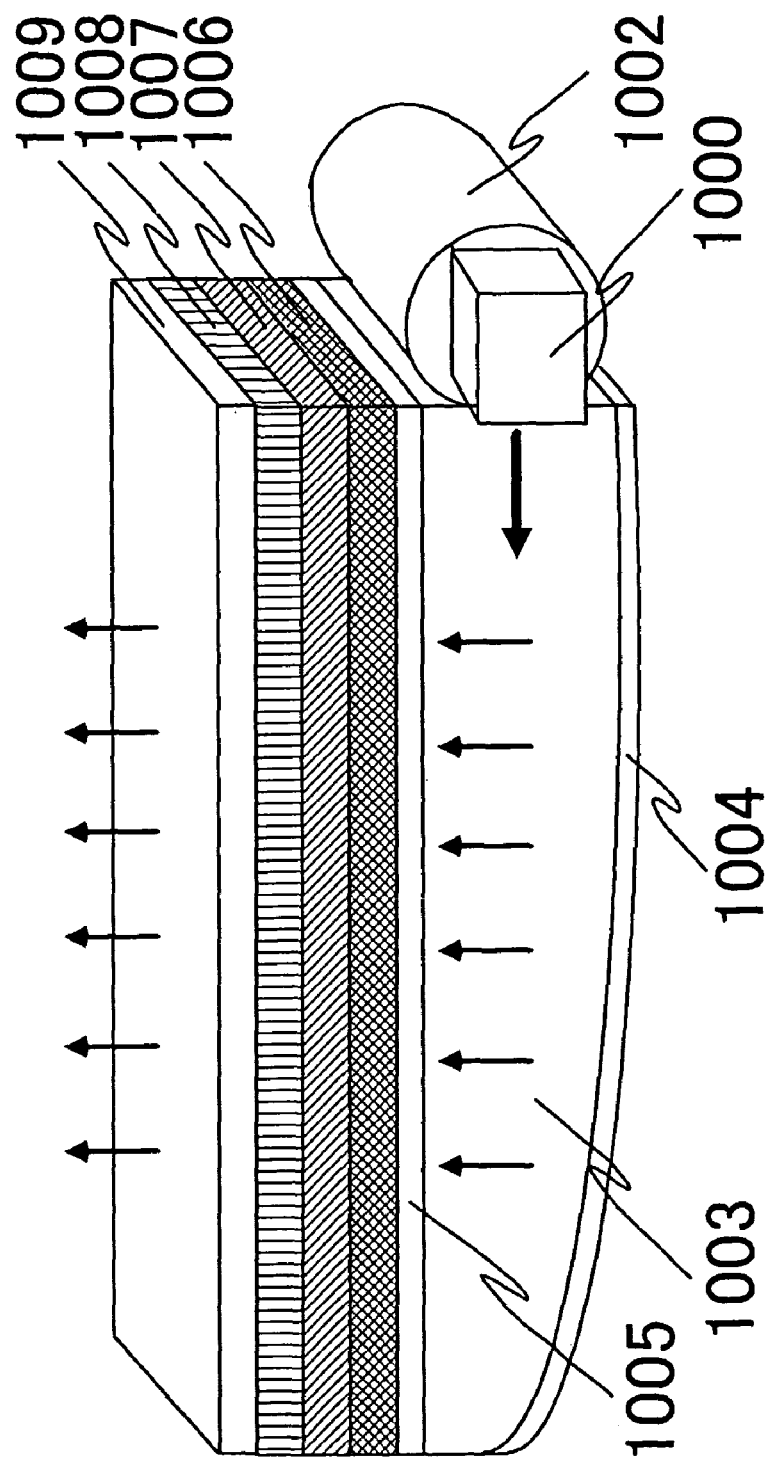
FIG. 13 is a schematic perspective view showing an illumination device according to the present invention.

An illumination device according to a seventh embodiment of the present invention as shown in FIGS. 12 and 13 may include a fluorescent member obtained in any of the foregoing embodiments. FIG. 12 shows a portion of the illumination device shown in FIG. 13.

Referring to FIG. 12, excitation light having a wavelength of 400 nm emitted from a GaN-based semiconductor laser 1000 enters a first light guide member 1001 formed of an acrylic resin in a cylindrical shape. A reflective film 1010 of silicon oxide is formed on an end face of first light guide member 1001 opposite to another end face coupled to semiconductor laser 1000. A metal reflective film 1002 of aluminum is formed on the peripheral surface of first light guide member 1001, except for a slit region.

The excitation light having entered first light guide member 1000 is emitted from the slit region of aluminum metal reflective film 1002. Thus, a point light source of semiconductor laser 1000 is converted to a linear light source.

The slit region of metal reflective film 1002 formed on the cylindrical surface of first light guide member 1001 is coupled to a second light guide member 1003 as shown in FIG. 13, so that the light emitted from first light guide member 1001 enters second light guide member 1003. The bottom surface of second light guide member 1003 is in an arc shape with respect to a propagation direction of the light having entered from first light guide member 1001. A metal reflective film 1004 of aluminum is further provided over the entire region of the bottom surface. The excitation light from first light guide member 1001 is propagated in second light guide member 1003, while some of the excitation light is reflected toward the upper direction of the second light guide member by metal reflective film 1004 of the arc shape. As such, the linear light source including the first light guide member is converted to a planar light source.

Over the upper surface of second light guide member 1003, there is formed an optical film (e.g., an interference filter) 1005 having optical properties of transmitting the excitation light and reflecting fluorescent lights emitted from fluorescent member layers 1006–1008 toward the upper direction, in order to prevent optical loss caused by scattering of the fluorescent lights into the second light guide member. A structure of such an optical film may be set as a dielectric multi-layer film such as of silicon oxide and aluminum oxide not absorbing excitation light, based on a common designing method of the optical multi-layer film utilizing the principle of multiple interference of light within the film.

The fluorescent member layers 1006, 1007 and 1008 for emitting lights of red, green and blue, respectively, obtained in any of the foregoing embodiments are stacked successively on at least a partial region of the upper surface of optical film 1005. When these fluorescent member layers are irradiated with the excitation light, the lights of the respective colors are emitted from the respective layers, which are mixed into white light and emitted to the upper space.

From the standpoint of safety for human eyes, at least a partial region of the upper surface of fluorescent member layer 1008 is provided with an optical film 1009 having optical properties of preventing the coherent excitation light from being emitted to the outer space and allowing the white light to be emitted to the outer space. A structure of optical film 1009 may be set as a dielectric multi-layer film such as of silicon oxide and aluminum oxide not absorbing the excitation light, based on a common designing method of the optical multi-layer film utilizing the principle of multiple interference of light within the film.

Since the illumination device of the present embodiment includes the fluorescent member having good light conversion efficiency obtained in any of the foregoing embodiments, it is possible to reduce the amount of excitation light required for obtaining the same amount of emission light as in the conventional case. Namely, it is possible to realize an illumination device consuming less power.

The illumination device may have a structure where the fluorescent member is directly irradiated with the excitation light, without provision of a light guide member. Further, all of the particles emitting lights of different colors of red, green and blue may be included in a single fluorescent member layer, instead of being included in stacked fluorescent member layers 1006–1008 as in the present embodiment.

(Eighth Embodiment)

Figure 14:
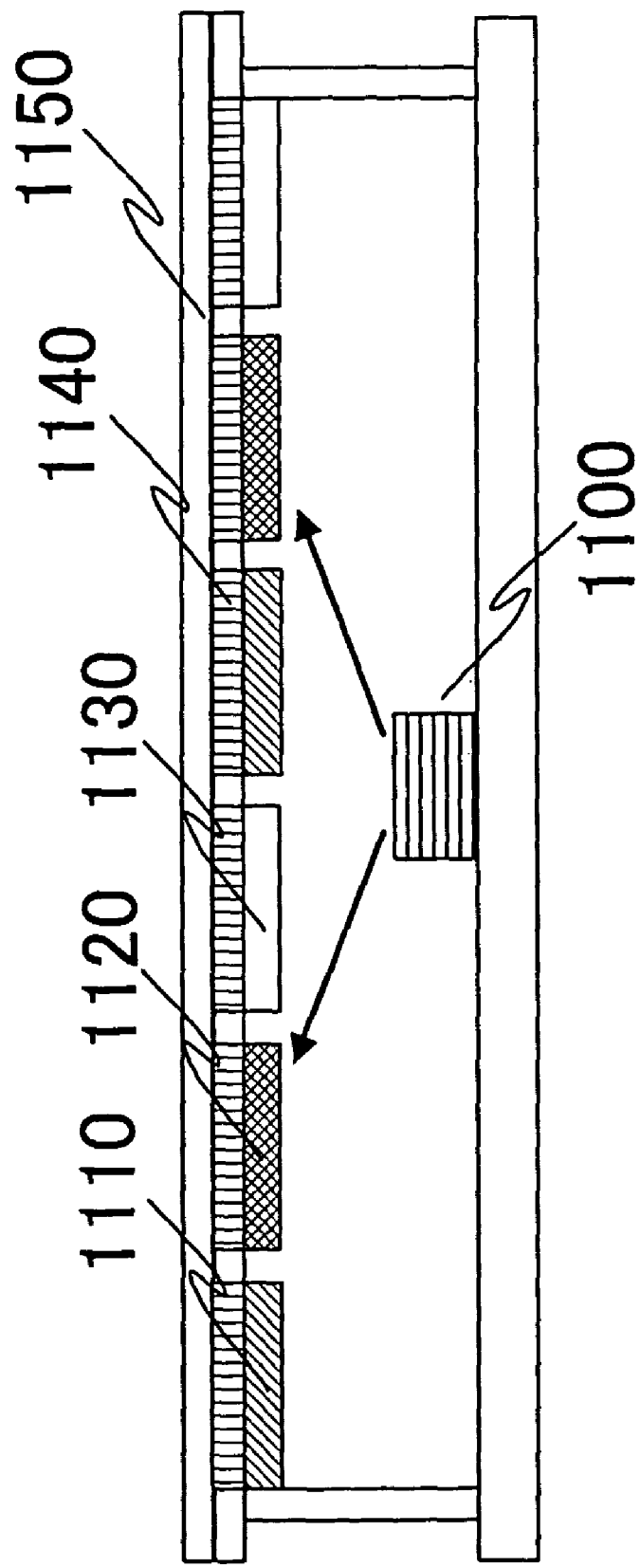
FIG. 14 is a schematic cross sectional view showing a display device according to the present invention.

Display devices according to an eighth embodiment of the present invention as shown in FIGS. 14 and 15 also may include fluorescent members obtained in any of the foregoing embodiments.

As shown in FIG. 14, excitation light having a wavelength of 400 nm emitted from a GaN-based semiconductor diode (1100) is directed to fluorescent members 1110, 1120 and 1130 which are arranged corresponding to respective pixels for emitting lights of red, green and blue, respectively. The fluorescent members used herein are those obtained in the foregoing embodiments.

A liquid crystal light-modulation element 1140 is provided on an upper surface of each fluorescent member. Liquid crystal light-modulation element 1140 includes an active matrix type TFT (thin film transistor) sandwiched between polarizing plates to control the intensity of light emitted from the fluorescent member. Means for absorbing light by a photoelectric absorption effect may also be used for the control means of the intensity of light emitted from the fluorescent member.

From the standpoint of safety for human eyes, at least a partial region of the upper surface of liquid crystal light conversion element 1140 is provided with an optical film 1150 having optical properties of preventing the coherent excitation light from being emitted to the outer space and allowing the light from the fluorescent member to be emitted to the upper space.

A structure of the optical film may be set as a dielectric multi-layer film such as of silicon oxide and aluminum oxide not absorbing the excitation light, based on a common designing method of the optical multi-layer film utilizing the principle of multiple interference of light within the film.

FIG. 15 shows another display device according to the present embodiment. In this display device, GaN-based semiconductor laser 1160 for emitting light of a wavelength of 400 nm is provided for each of fluorescent members 1110, 1120 and 1130 which are arranged corresponding to the respective pixels and emit lights of red, green and blue, respectively. A drive circuit 1170 is connected to semiconductor lasers 1160 in order to control the amounts of the excitation lights emitted from the respective semiconductor lasers independently from each other. Such control of the amounts of excitation lights allows control of the intensities of lights emitted from the fluorescent members in the respective pixels.

Further, at least a partial region of each fluorescent member 1110, 1120 and 1130 is provided with an optical film 1150, similarly as in the case of FIG. 14.

Since the display device of the present embodiment includes the fluorescent members excellent in light conversion efficiency obtained in any of the foregoing embodiments, it is possible to reduce the amount of excitation light required for obtaining the same amount of emission light as in the conventional case. Namely, it is possible to realize a display device consuming less power.

As described above, a particle composed of a semiconductor core and a coating layer covering the core is made to have a particle size causing Mie scattering with respect to excitation light, so that it is possible to obtain a fluorescent member excellent in light conversion efficiency as well as in chromaticity characteristic (with respect to shift of color).

An illumination device and a display device both consuming less power can be obtained by utilizing the above fluorescent members.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A fluorescent member comprising a plurality of particles dispersed in a medium, wherein
   each of said particle includes at least one core and a coating layer covering the at least one core,
   said at least one core has a diameter of between 5 nm and 100 nm and is formed of a semiconductor for absorbing excitation light and emitting light having a wavelength different from a wavelength of the excitation light, said at least one core formed of a semiconductor selected from $In_xGa_yAl_{1-x-y}N$ ($0 \leq x \leq 1$, $0 \leq y \leq 1$, $x+y \leq 1$), and $Zn_xMg_yCd_{1-x-y}Se_vS_{1-v}$ ($0 \leq x \leq 1$, $0 \leq y \leq 1$, $x+y \leq 1$, $0 \leq v \leq 1$); and
   said particle has a particle size for causing Mie scattering with respect to said excitation light, wherein each of said particles includes a plurality of cores for emitting light of the same wavelength and said coating layer covering the cores.

2. The fluorescent member according to claim 1, wherein said coating layer is formed of a semiconductor different in composition or composition ratio from said core.

3. An illumination device comprising the fluorescent member of claim 1 and a light source for exciting the fluorescent member.

4. A display device comprising the fluorescent member of claim 1, a light source for exciting the fluorescent member, and light control means for controlling at least one of intensity of excitation light directed to said fluorescent member and intensity of light emitted from said fluorescent member.

5. A fluorescent member comprising a plurality of particles dispersed in a medium, wherein
   each of said particles includes at least one core and a coating layer covering the at least one core,
   said at least one core has a diameter of between 5 nm and 100 nm and is formed of a semiconductor for absorbing excitation light and emitting light having a wavelength different from a wavelength of the excitation light, said at least one core formed of a semiconductor selected from $In_xGa_yAl_{1-x-y}N$ ($0 \leq x \leq 1$, $0 \leq y \leq 1$, $x+y \leq 1$), and $Zn_xMg_yCd_{1-x-y}Se_vS_{1-v}$ ($0 \leq x \leq 1$, $0 \leq y \leq 1$, $x+y \leq 1$, $0 \leq v \leq 1$); and
   said particle has a particle size for causing Mie scattering with respect to said excitation light, wherein each of said particles includes a plurality of cores for emitting lights of different wavelengths and said coating layer covering the cores.

6. The fluorescent member according to claim 5, wherein said coating layer is formed of a semiconductor different in composition or composition ratio from said core.

7. The fluorescent member according to claim 5, wherein said fluorescent member includes a plurality of cores different in composition or composition ratio from each other.

8. The fluorescent member according to claim 5, wherein said fluorescent member includes a plurality of cores same in composition ratio and different in size with each other.

9. An illumination device comprising the fluorescent member of claim 5 and a light source for exciting the fluorescent member.

10. A display device comprising the fluorescent member of claim 5, a light source for exciting the fluorescent member, and light control means for controlling at least one of intensity of excitation light directed to said fluorescent member and intensity of light emitted from said fluorescent member.

11. A fluorescent member comprising a plurality of particles dispersed in a medium, wherein
each of said particles includes at least one core and a coating layer covering the at least one core,
said at least one core has a diameter of between 5 nm and 16 nm and is formed of a semiconductor for absorbing excitation light and emitting light having a wavelength different from a wavelength of the excitation light, said at least one core formed of a semiconductor selected from $In_xGa_yAl_{1-x-y}N$ ($0 \leq x \leq 1$, $0 \leq y \leq 1$, $x+y \leq 1$), and $Zn_xMg_yCd_{1-x-y}Se_vS_{1-v}$ ($0 \leq x \leq 1$, $0 \leq y \leq 1$, $x+y \leq 1$, $0 \leq v \leq 1$); and
said particle has a particle size for causing Mie scattering with respect to said excitation light.

12. The fluorescent member according to claim 11, wherein said coating layer is formed of a semiconductor different in composition or composition ratio from said core.

13. The fluorescent member according to claim 11, wherein said fluorescent member includes a plurality of cores different in composition or composition ratio from each other.

14. The fluorescent member according to claim 11, wherein said fluorescent member includes a plurality of cores same in composition ratio and different in size with each other.

15. An illumination device comprising the fluorescent member of claim 11 and a light source for exciting the fluorescent member.

16. A display device comprising the fluorescent member of claim 11, a light source for exciting the fluorescent member, and light control means for controlling at least one of intensity of excitation light directed to said fluorescent member and intensity of light emitted from said fluorescent member.

17. The fluorescent member according to claim 11, wherein said at least one core has a diameter of 13 nm or less.

18. A fluorescent member comprising a plurality of particles dispersed in a medium, wherein
each of said particles includes at least one core and a coating layer covering the at least one core,
said at least one core has a diameter of between 5 nm and 16 nm and is formed of a semiconductor for absorbing excitation light and emitting light having a wavelength different from a wavelength of the excitation light, said at least one core is formed of a semiconductor selected from $In_xGa_yAl_{1-x-y}N$ ($0 \leq x \leq 1$, $0 \leq y \leq 1$, $x+y \leq 1$), and $Zn_xMg_yCd_{1-x-y}Se_vS_{1-v}$ ($0 \leq x \leq 1$, $0 \leq y \leq 1$, $x+y \leq 1$, $0 \leq v \leq 1$); and
a particle size D (μm) of said particle and a wavelength λ(μm) of said excitation light satisfy a relation of $D/\lambda \leq 0.2$.

19. The fluorescent member according to claim 18, wherein said coating layer is formed of a semiconductor different in composition or composition ratio from said core.

20. The fluorescent member according to claim 18, wherein said fluorescent member includes a plurality of cores different in composition or composition ratio from each other.

21. The fluorescent member according to claim 18, wherein said fluorescent member includes a plurality of cores same in composition ratio and different in size with each other.

22. The fluorescent member according to claim 18, wherein each of said particles includes a plurality of cores for emitting light of the same wavelength and said coating layer covering the cores.

23. The fluorescent member according to claim 18, wherein each of said particles includes a plurality of cores for emitting lights of different wavelengths and said coating layer covering the cores.

24. An illumination device comprising the fluorescent member of claim 18 and a light source for exciting the fluorescent member.

25. A display device comprising the fluorescent member of claim 18, a light source for exciting the fluorescent member, and light control means for controlling at least one of intensity of excitation light directed to said fluorescent member and intensity of light emitted from said fluorescent member.

26. The fluorescent member according to claim 18, wherein said at least one core has a diameter of 13 nm or less.

27. A fluorescent member comprising a plurality of particles dispersed in a medium, wherein
each of said particles includes at least one core and a coating layer covering the at least one core,
said at least one core has a diameter of between 5 nm and about 13 nm and is formed of a semiconductor for absorbing excitation light and emitting light having a wavelength different from a wavelength of the excitation light, said at least one core formed of a semiconductor selected from Si, and C; and
said particle has a particle size for causing Mie scattering with respect to said excitation light.

28. The fluorescent member according to claim 27, wherein said coating layer is formed of a semiconductor different in composition or composition ratio from said core.

29. The fluorescent member according to claim 27, wherein said fluorescent member includes a plurality of cores different in composition or composition ratio from each other.

30. The fluorescent member according to claim 27, wherein said fluorescent member includes a plurality of cores same in composition ratio and different in size with each other.

31. An illumination device comprising the fluorescent member of claim 27 and a light source for exciting the fluorescent member.

32. A display device comprising the fluorescent member of claim 27, a light source for exciting the fluorescent member, and light control means for controlling at least one of intensity of excitation light directed to said fluorescent member and intensity of light emitted from said fluorescent member.

33. A fluorescent member comprising a plurality of particles dispersed in a medium, wherein
each of said particles includes at least one core and a coating layer covering the at least one core, said at least one core has a diameter of between 5 nm and 13 nm and is formed of a semiconductor for absorbing excitation light and emitting light having a wavelength different from a wavelength of the excitation light, said at least one core is formed of a semiconductor selected from Si, and C; and a particle size D) (μm) of said particle and a wavelength λ(μm) of said excitation light satisfy a relation of $D/\lambda \leq 0.2$.

34. The fluorescent member according to claim 33, wherein said coating layer is formed of a semiconductor different in composition or composition ratio from said core.

35. The fluorescent member according to claim 33, wherein said fluorescent member includes a plurality of cores different in composition or composition ratio from each other.

36. The fluorescent member according to claim 33, wherein said fluorescent member includes a plurality of cores same in composition ratio and different in size with each other.

37. The fluorescent member according to claim 33, wherein each of said particles includes a plurality of cores for emitting light of the same wavelength and said coating layer covering the cores.

38. The fluorescent member according to claim 33, wherein each of said particles includes a plurality of cores for emitting lights of different wavelengths and said coating layer covering the cores.

39. An illumination device comprising the fluorescent member of claim 33 and a light source for exciting the fluorescent member.

40. A display device comprising the fluorescent member of claim 33, a light source for exciting the fluorescent member, and light control means for controlling at least one of intensity of excitation light directed to said fluorescent member and intensity of light emitted from said fluorescent member.

* * * * *